United States Patent
Hou et al.

(10) Patent No.: US 8,322,224 B2
(45) Date of Patent: Dec. 4, 2012

(54) PRESSURE SENSOR WITH FIXED DEFORMABLE AREA

(75) Inventors: Chih-Sheng Hou, Taipei (TW); Chia-Hung Chou, Hsinchu (TW)

(73) Assignees: Universal Cement Corporation, Taipei (TW); Industrial Technology Research Institute, Hsinchu (TW)

( * ) Notice: Subject to any disclaimer, the term of this patent is extended or adjusted under 35 U.S.C. 154(b) by 332 days.

(21) Appl. No.: 12/822,595

(22) Filed: Jun. 24, 2010

(65) Prior Publication Data

US 2011/0314923 A1    Dec. 29, 2011

(51) Int. Cl.
  *G01L 9/06* (2006.01)
(52) U.S. Cl. .......................................... 73/727
(58) Field of Classification Search .............. 73/725, 73/754, 721, 727
See application file for complete search history.

(56) References Cited

U.S. PATENT DOCUMENTS

| | | | |
|---|---|---|---|
| 7,210,357 B2 * | 5/2007 | Tanaka et al. | 73/754 |
| 7,762,141 B2 * | 7/2010 | Tanaka et al. | 73/725 |
| 8,210,994 B2 * | 7/2012 | Chang et al. | 482/83 |

* cited by examiner

*Primary Examiner* — Jewel V Thompson
(74) *Attorney, Agent, or Firm* — Lowe Hauptman Ham & Berner LLP

(57) ABSTRACT

A pressure guiding bump is configured on the center of a pressure gauge to obtain a single "conductivity--pressure" curve feature which is independent from any position wherever a pressure is applied on the guiding bump. When a pressure is applied, the guiding bump guides the pressure against a fixed deformable area to be deformed, whatever the pressure is, the deformed area is nearly a same area. The pressure gauge is extraordinarily adequate to be designed in a weighing machine with parallel connection in between them.

16 Claims, 19 Drawing Sheets

PRESSURE SENSOR WITH FIXED DEFORMABLE AREA

FIELD OF THE INVENTION

This invention relates to a pressure gauge, especially a pressure gauge having a pressure guiding bump, to which a fixed area is pressed to deform when a pressure is applied thereon.

BACKGROUND

FIGS. 1-6 is a prior art

FIG. 1 shows a prior art of a pressure gauge

A section view of the traditional pressure gauge is shown. A piezoresistor is made of a top stack TS and a bottom stack BS. A spacer 15 is inserted in between the two stakes in the periphery to make a center space 16 in between the two stacks.

The top stack TS includes sequentially from top to bottom: a top substrate 10, a top metal electrode 11, and a top piezoresistive layer 12. The bottom stack BS includes sequentially from top to bottom: a bottom piezoresistive layer 129, a bottom metal electrode 11, and a bottom substrate 109. A spacer 15 is inserted to form a center space 16 in between the top piezoresistive layer 12 and the bottom piezoresistive layer 129. The top metal electrode 11 electrically couples to a first electrode of the electronic system 13, and the bottom electrode 129 electrically couples to a second electrode of the electronic system 13.

FIG. 2 is an initial status of the prior art

When a pressure is applied to the pressure gauge 100 initially, the top piezoresistive layer 12 bends down to touch the bottom piezoresistive layer 129. Just before touching, an initial thickness L1 is a total thickness of the top piezoresistive layer 12 plus the bottom piezoresistive 129. An output resistance can be calculated according to ohm's law as: $R1 = \rho L1/A1$. At initial status, the contact area A1 at point P1 approaches zero. Therefore, the output resistance R1 is calculated to be infinite as follows:

$$R1 \rightarrow \infty \text{ when } A1 \rightarrow 0.$$

FIG. 3 is a stable status under pressure of the prior art

The pressure gauge 100 is pressed further so that the piezoresistive layers 12, 129 are compressed and the total thickness L2 of the two piezoresistive layers 12, 129 becomes lesser than the initial thickness L1. In the meanwhile, the contact area A2 at area P2 is larger than the initial contact area A1. At this moment, the output resistance is calculated as follows:

$$R2 = \rho L2/A2 \circ$$

FIG. 4 is pressure tests of the prior art

Three different points P1, P2, and P3 are chosen to be tested in a prior art pressure gauge 100. Point P1 is the center of the pressure gauge 100, point P2 is a little far away from the center point P1, and point P3 is even farther away from the center point P1. Various pressures are applied to each of the three points for checking the corresponding conductance, the conductance--pressure curves are then made as shown in FIG. 5.

FIG. 5 is the conductance--pressure curves for points P1, P2, and P3

The top line is for point P1, the middle line is for point P2, and the bottom line is for point P3. The curve for P1 has a largest slop, the curve for P2 has a less slop, and the curve for P3 has a least slop. The curve slop is lesser as the test point farther away from the center. In other words, the farther a test point is away from the center, the less precision it becomes. Further in other words, different conductance can be obtained when a same pressure is applied at a different point of a traditional pressure gauge 100. Curve P1 has the best identification ability, curve P2 has moderate identification ability, and curve P3 has the worst identification ability. The position dependent curve--pressure feature makes the prior art pressure gauge 100 unreliable, unless a fixed test position is used. Take an example to see different conductance is obtained for a same pressure: a conductance of 6.5*10exp (−4)/ohm is obtained for curve P1 at 20 psi; a conductance of 3.5*10exp (−4)/ohm is obtained for curve P2 at 20 psi; and a conductance of 2.8*10exp (−4)/ohm is obtained for curve P3 at 20 psi. Serious problems shall be caused if the prior art pressure gauge 100 is designed in a weighing machine with parallel connection. It becomes a big challenge as how to design a correction circuit to modify the deviation in order to obtain a linear output in order for realizing a weighing machine with the traditional pressure gauge 100.

FIG. 6 is a pressure test with prior art pressure gauge.

FIG. 6 shows when a product Wt with a rugged bottom is put on a parallel connected prior art pressure gauges 101, 102, 103 which are configured on a substrate 209. As shown in the figure, the rugged bottom of the product Wt touches point P1 of the pressure gauge 101, touches point P2 of the pressure gauge 102, and touches point P3 of the pressure gauge 103. It is difficult to obtain an accurate weight from the prior art pressure gauge 100 because of the non-consistent conductance-pressure curve for different points P1, P2 and P3.

Now, please refer to FIG. 3. The basic principle for the prior art follows the Law of Resistance $R = \rho L/A$, the changes of the total thickness L, and the changes of the touching area A between the two piezoresistive layers 12, 129 are two determinants for the output resistance R. Therefore, the prior art pressure gauge needs to consider the two factors when a pressure is applied, and especially when a pressure is applied on partial area instead of full surface of the pressure gauge 100. Further more, an anti-pressure of the spacer 15 in the peripheral is another headache problem needs to be overcome for the prior art pressure gauge 100. A single conductance--pressure curve for a pressure gauge independent of position with a stable and reproducible output is desired for a long time.

DETAILED DESCRIPTION OF THE INVENTION

A single conductance--pressure curve for a pressure gauge independent of position with a stable and reproducible output is accordingly devised to overcome the shortcomings of the prior art. The revised pressure gauge has a fixed deformable area which eliminates output deviation of the prior art.

A guiding bump which can be made of rubber or something similar is configured on top center of the pressure gauge; the guiding bump is a hard piece to press a fixed area independent of the magnitude of an applied pressure and independent of the position of the applied pressure. Because the deformed area A is a constant and therefore the thickness changes L of the deformed piezoresistive layers is the only consideration for the output resistance.

$R=\rho L/A$, since deformable area A becomes a constant, the resistance is simplified as follows: $R=kL$ A pressure gauge with single conductance-pressure curve independent of position is obtained according to the invention. The anti-pressure caused from the spacer can be overcome by the arrangement of the guiding bump in a position of the top center and the guiding bump does not extend to the periphery of the pressure gauge. Since the modified pressure gauge has a single conductance--pressure curve, it is suitable to be designed in parallel connection with each other or one another to form an ideal weighing machine.

Figure 7:
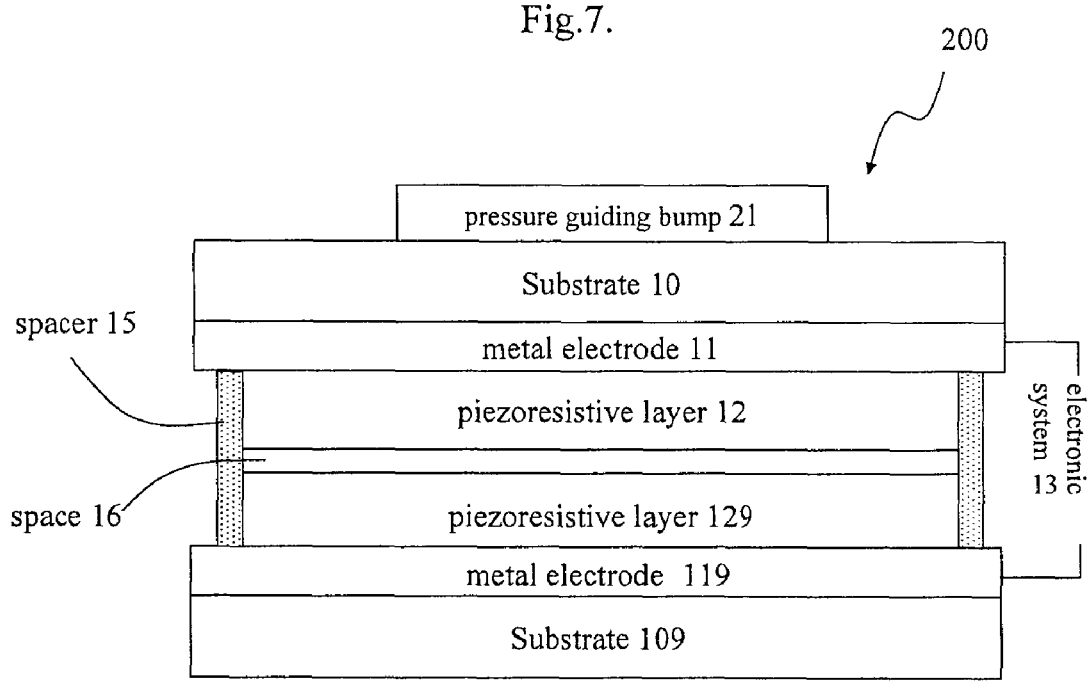
FIGS. 7~9 is a first embodiment according to the present invention.
Figure 8:
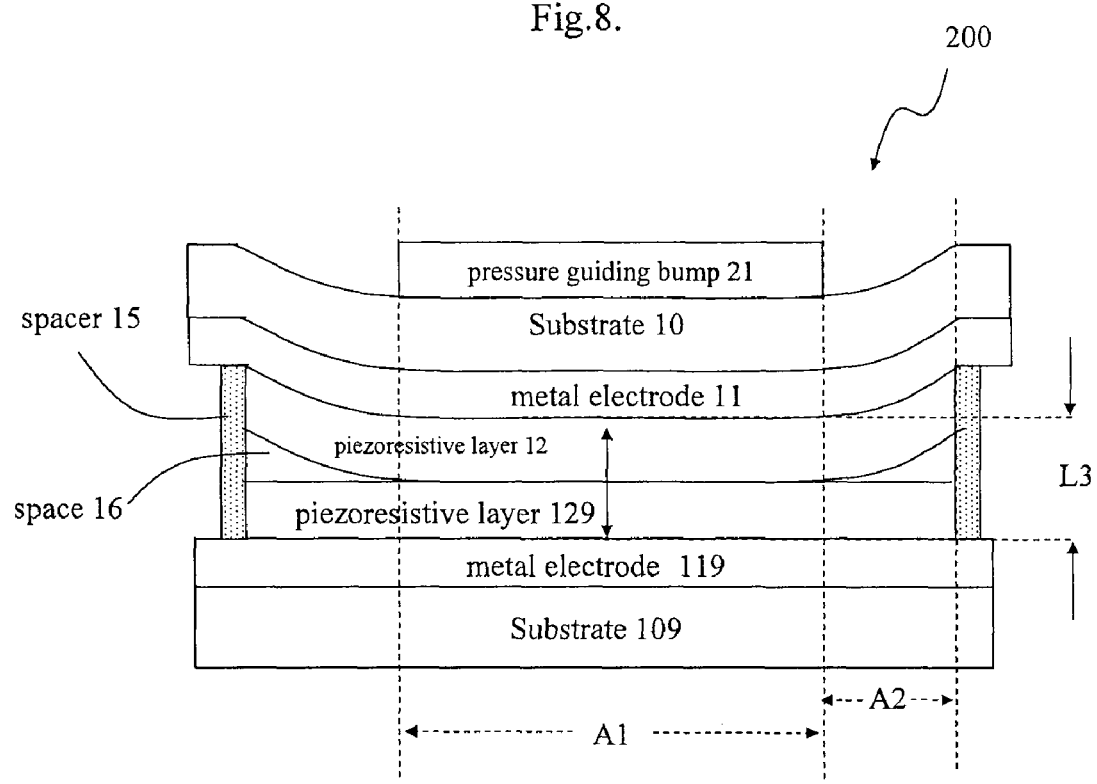
Figure 9:
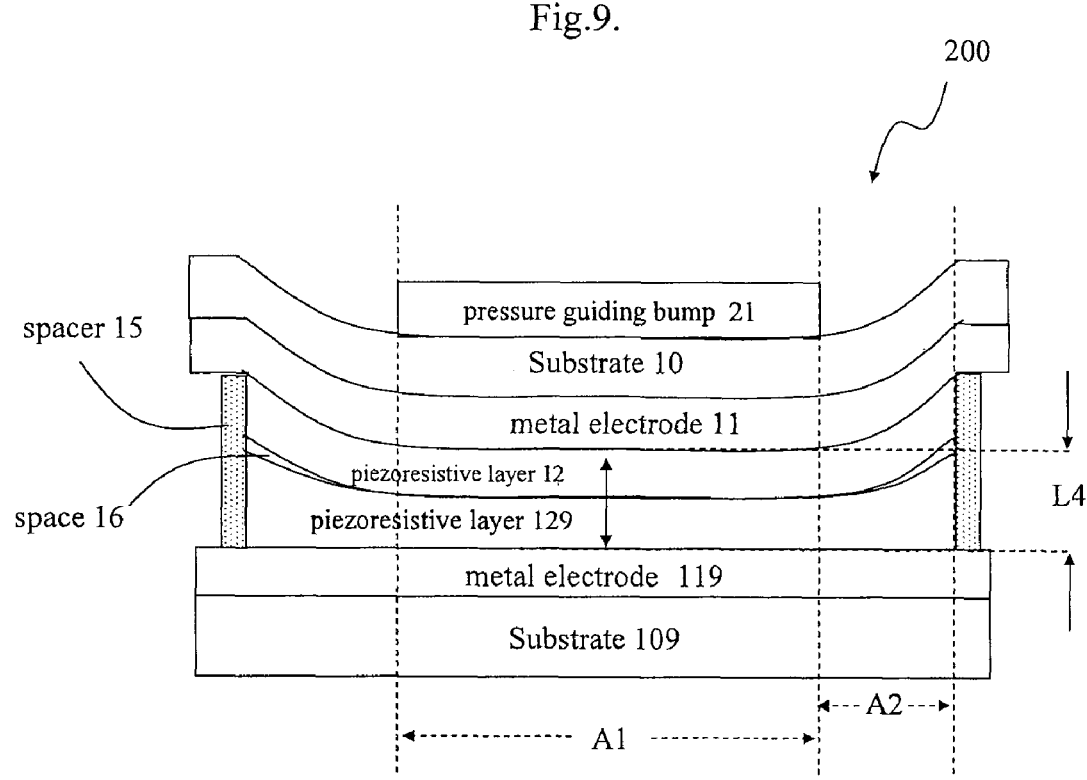

FIGS. 7~9 is a first embodiment according to the present invention.

FIG. 7 is a section view of the structure of the first embodiment.

Figure 1:
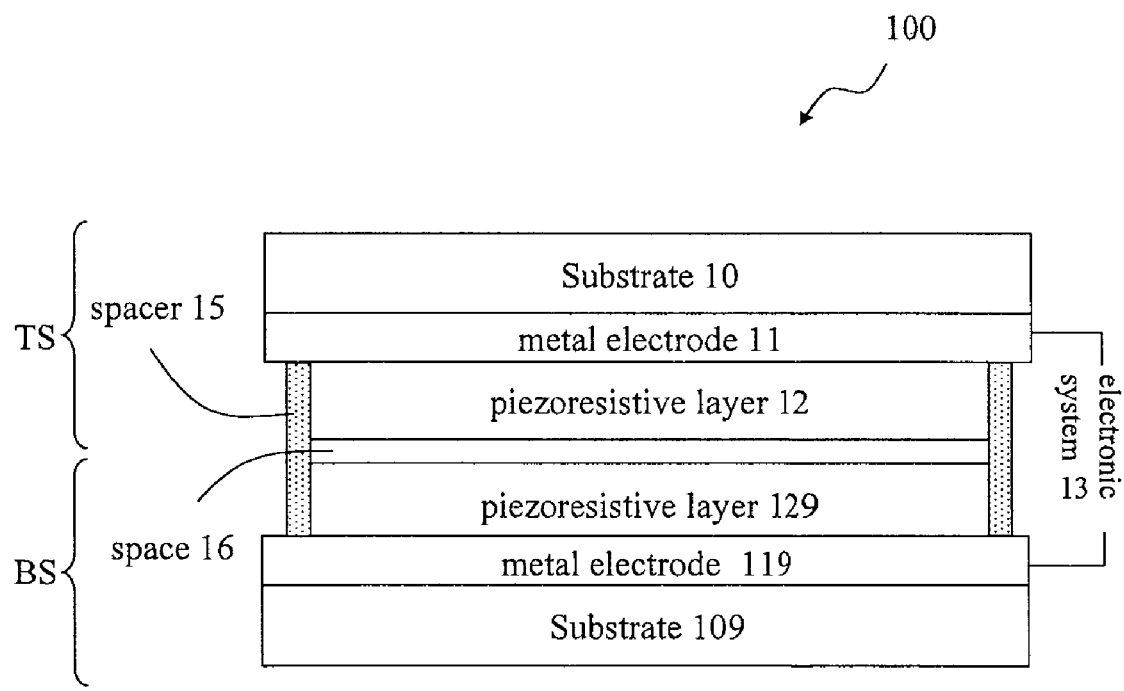
FIG. 1~6 Prior Art
Figure 2:
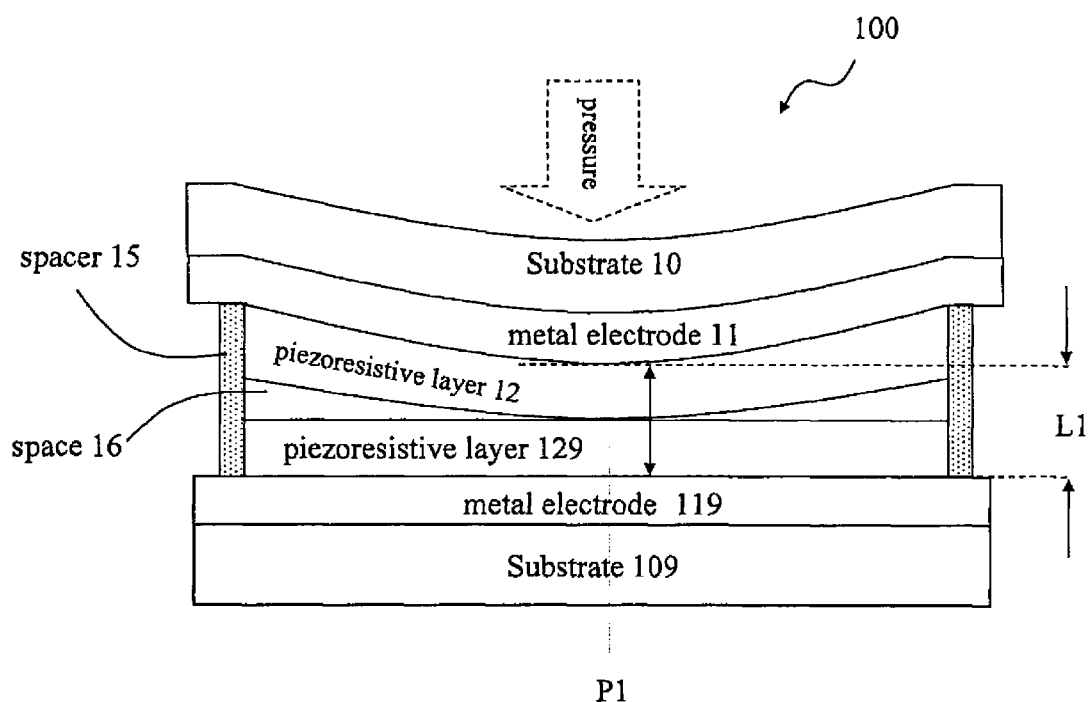
Figure 3:
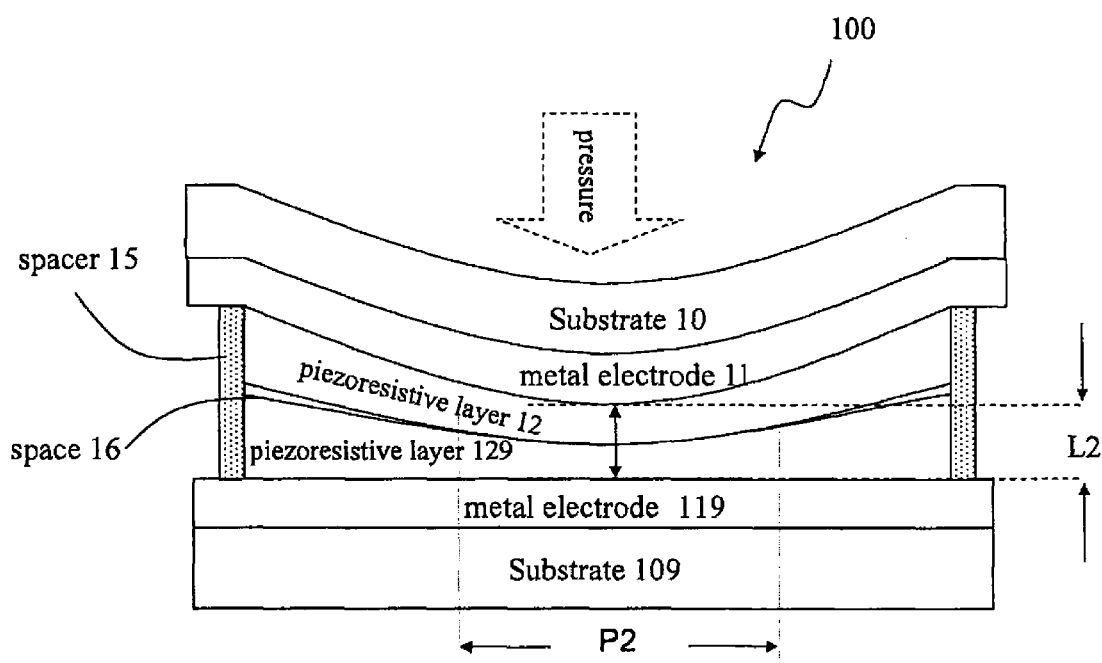
Figure 4:
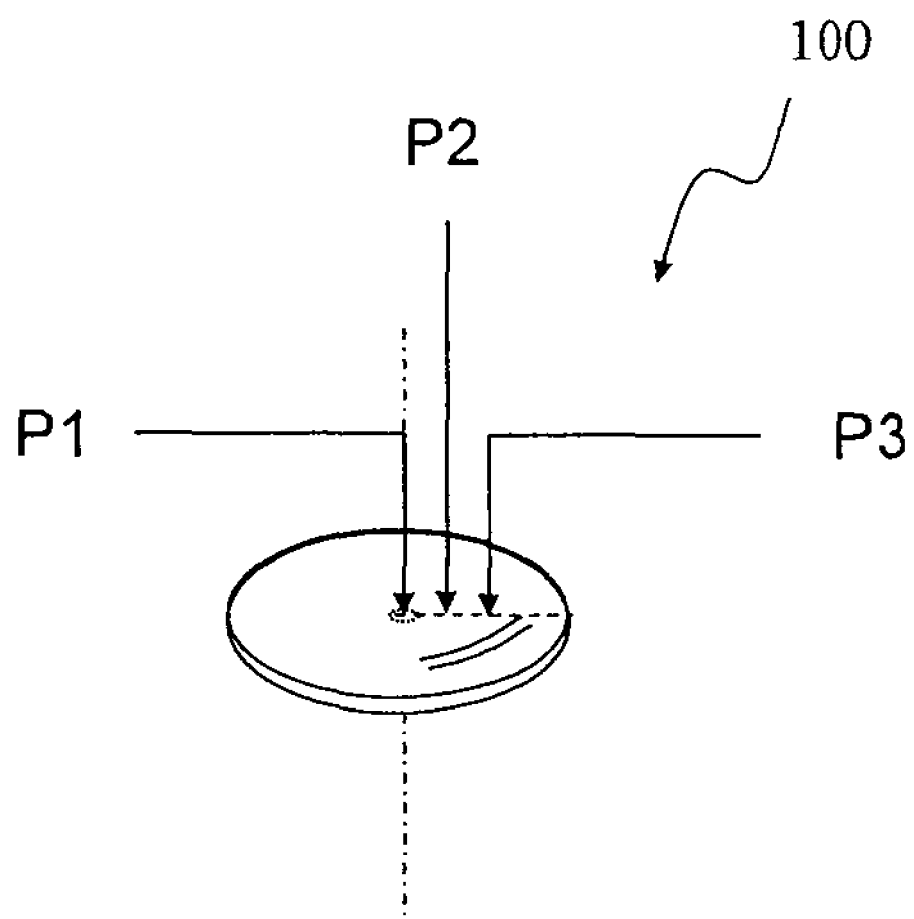
Figure 5:
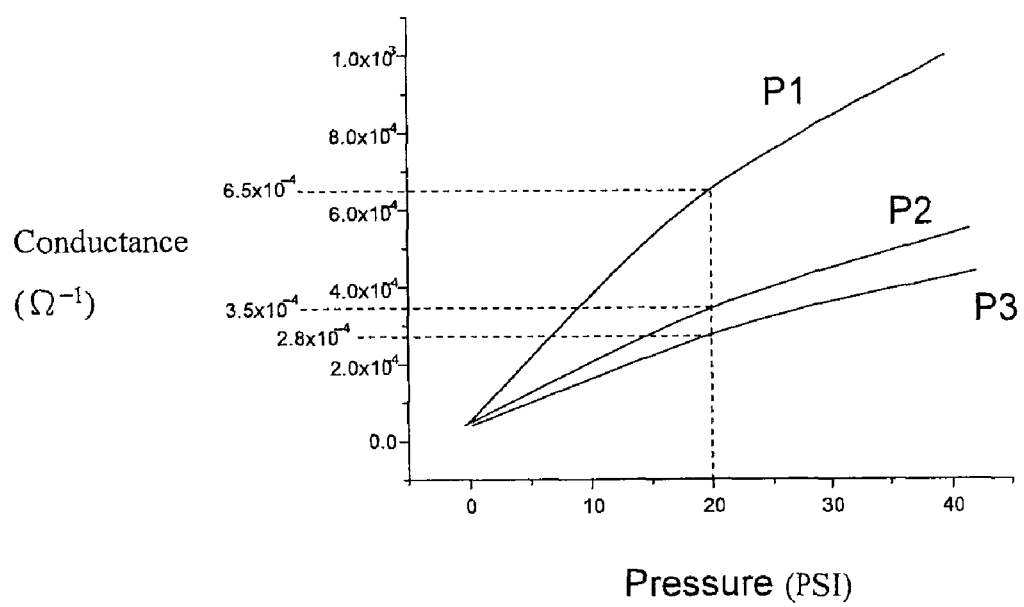
Figure 6:
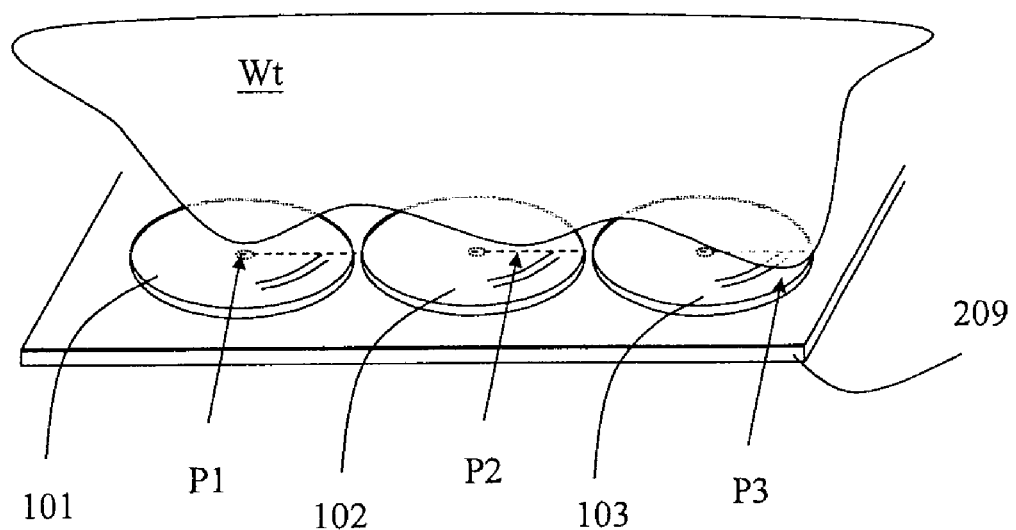

A guiding bump 21 is configured on the top center of the top substrate 10 of a prior art pressure gauge 100 as shown in FIG. 1 to form revised a pressure gauge 200 according to the present invention. The guiding bump 21 is located in an area not extending to the periphery to avoid the anti-pressure caused by the spacer 15 when a pressure is applied.

FIG. 8 is an initial status for FIG. 7

Initially, when a pressure is applied, the guiding bump 21 is downward pressed with a fixed deformable area A1, the deformed area A1 is designed to be in a center area keeping away from the spacer 15 with a clearance A2 to avoid the anti-pressure from the spacer 15. The initial total thickness L3 is the sum of the thickness of both piezoresistive layers 12,129.

FIG. 9 is a stable status under a pressure for FIG. 7

A fixed deformable area A1 is downward compressed. When stable, the total thickness L4 becomes lesser than the initial total thickness L3. Thickness L4 is a sum of the compressed thickness of the two piezoresistive layers 12, 129. Since the deformable area A is a constant, the output resistance R can be calculated according to the simplified formula:

$R=kL$.

Figure 10:
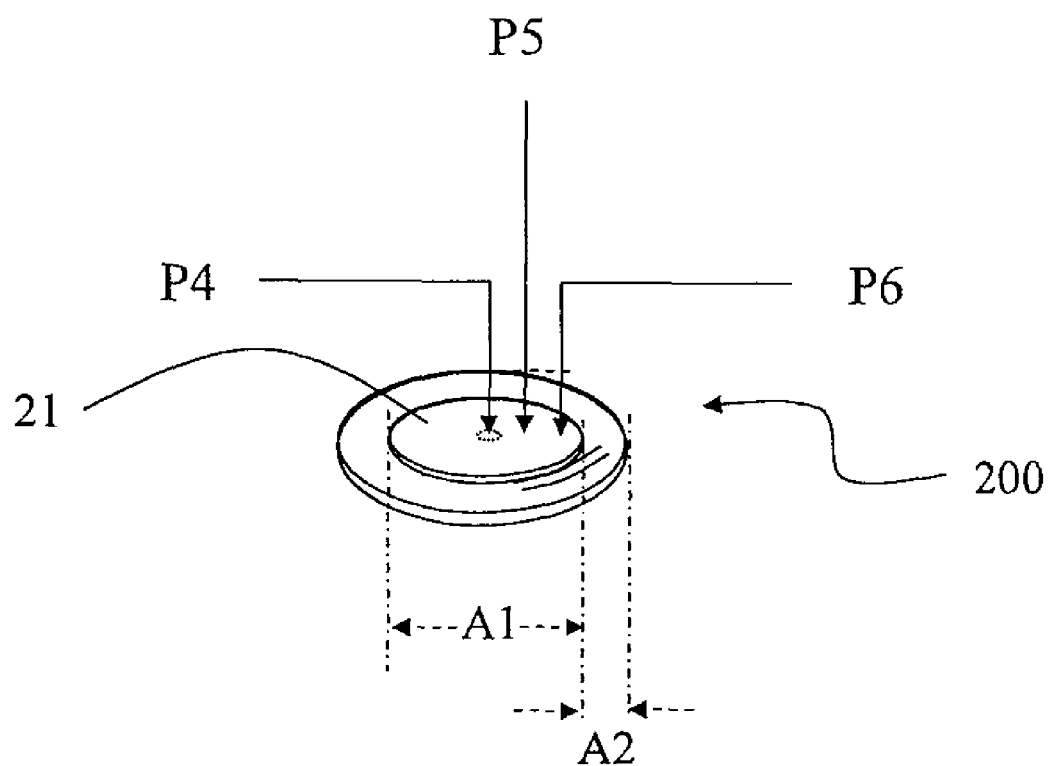
FIG. 10 is a perspective view of a product according to FIG. 7

FIG. 10 is a perspective view of a product according to FIG. 7

A flat guiding bump 21 made of a hard material such as plastic, metal . . . etc is configured on the top center of the pressure gauge 200. A fixed deformable area A1 is downward compressed when a pressure is applied on the guiding bump 21. The compressed area is always the same wherever the pressure is applied on the bump 21, for example, a same conductance or resistance output is obtained if a same pressure is applied either at point P4, point P5, or point P6. Point P4 is at the center of the bump 21, point P5 is a little far away from point P4, and point P6 is even farther away from point P4.

Figure 11:
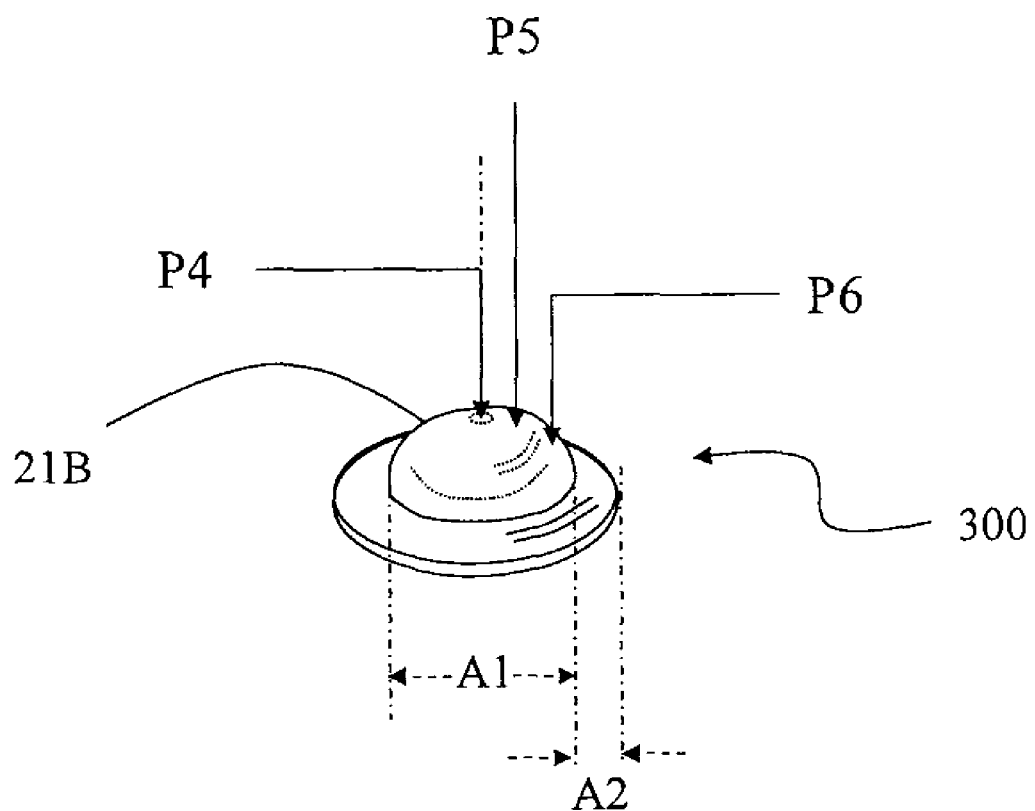
FIG. 11 is a modification design to FIG. 10.

FIG. 11 is a modification design to FIG. 10.

A convex guiding bump 21B is configured on the top center of the pressure gauge 300. The structure is similar to the product of FIG. 10. The feature and effect is the same as that of the product of FIG. 10.

Figure 12:
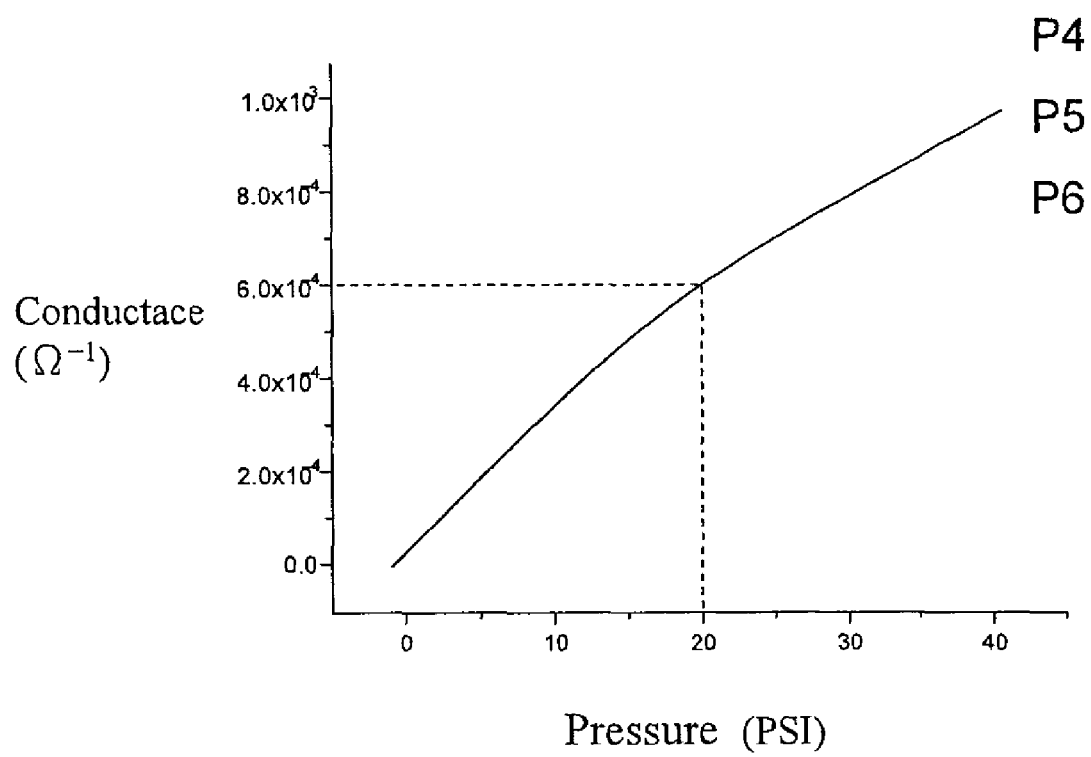
FIG. 12 is a constant conductance-pressure curve for a product of either FIG. 10 or FIG. 11

FIG. 12 is a constant conductance-pressure curve for a product of either FIG. 10 or FIG. 11

A single conductance-curve independent of position is shown as FIG. 12 for a product of either FIG. 10 or FIG. 11. e.g. A same value of $6.0*10^{-4}$/ohm is obtained when a same pressure is applied either on point P4, P5, or P6 to the product of FIG. 10 or FIG. 11.

Figure 13A:
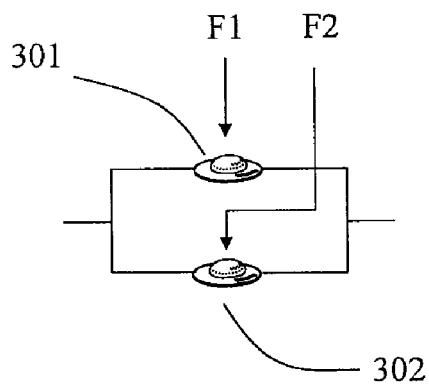
FIG. 13A is a parallel connection of pressure gauges as shown in FIG. 11

FIG. 13A is a parallel connection of pressure gauges as shown in FIG. 11

The product of FIG. 11 can be designed in a form of parallel connection so as to form a weighing machine for measuring bigger weights. A first pressure gauge 301 is connected in parallel with a second pressure gauge 302. A first pressure F1 and a second pressure F2 can be added to output through a calculation circuit when the first pressure F1 is applied on the first pressure gauge 301 and the second pressure F2 is applied on the second pressure gauge 302.

Figure 13B:
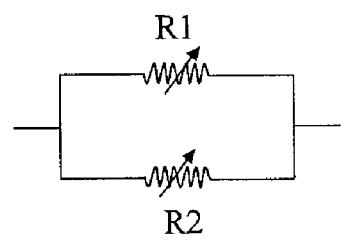
FIG. 13B is an equivalent circuit for a product of FIG. 13A

FIG. 13B is an equivalent circuit for a product of FIG. 13A

The first pressure gauge 301 represents a first variable resistor R1, and the second pressure gauge 302 represents a second variable resistor R2. Each of the first variable resistor R1 and the second variable resistor R2 reveals a same conductance--pressure curve feature. The output resistance R is calculated as: $1/R=1/R1+1/R2$. When an object Wt with a weight WG weighs on a weighing machine of FIG. 13A, the weight WG is calculated as follows:

$$WG = F1 + F2$$
$$= \alpha/R1 + \alpha/R2$$
$$= \alpha(1/R1 + 1/R2)$$
$$= \alpha/(R1 \| R2)$$
$$= \alpha/R$$

According to Ohm's law $R=V/I$, the weight WG is further calculated as:

$WG=\alpha*I/V_\circ$

Wherein, WG is the weight, F1 is a force applied on the first gauge, F2 is a force applied on the second gauge, and $\alpha$ is a constant.

This embodiment can be realized only when both the variable resistor R1 and R2 have a linear output for the resistance. The pressure gauges 200, 300 according to this invention well satisfies the requirement to have a linear output.

Figure 14:
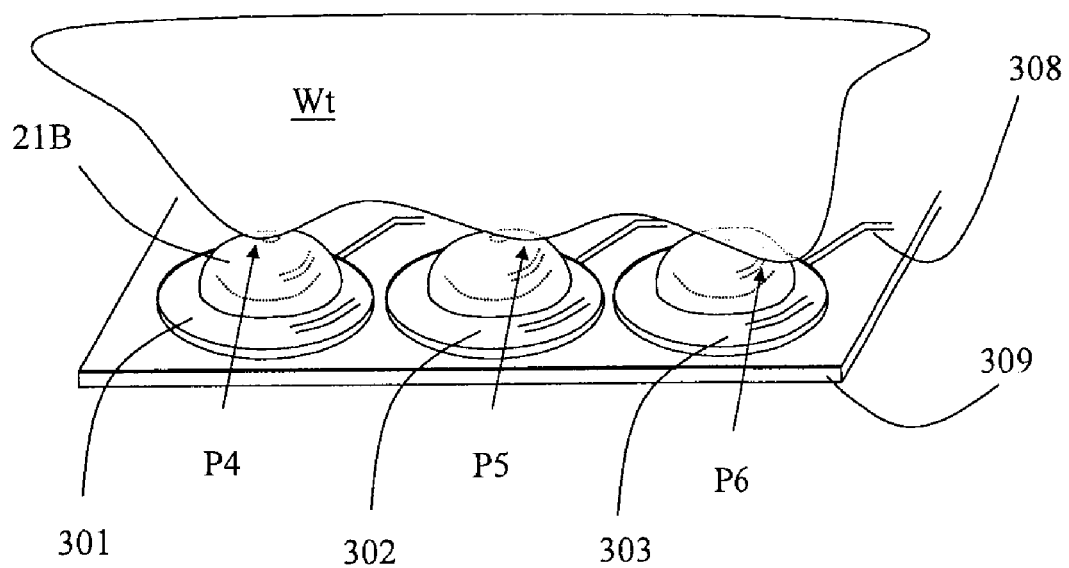
FIG. 14 is a testing example for FIG. 13A

FIG. 14 is a testing example for FIG. 13A

A weighing machine is made of three parallel connected pressure gauges 301, 302, 303 according to FIGS. 13A, 13B. The three pressure gauges 301, 302, 303 are configured on a substrate 309 which can be a flexible or non-flexible one. Electric wires 308 are configured on top surface of the substrate 309, and electrically couple each and all of the pressure gauges 301, 302, 303 to an electronic system (not shown). An object with a weight Wt has a rugged bottom surface and contacts the three pressure gauges 301, 302, 302 at points P4, P5, and P6 individually. Point P4 is on the center of the pressure gauge 301, point P5 is a little far away from the center of the pressure gauge 302, and point P6 is even farther away from the center of the pressure gauge 303. A reproducible weight Wt can be obtained according to this invention; however which can not be obtained if made with traditional pressure gauges of FIG. 1. This is because each of the three pressure gauges 301, 302, 303 has a single conductance-pressure curve feature which is independent of position to be pressed on each of the pressure gauges 301, 302, 303.

Figure 15:
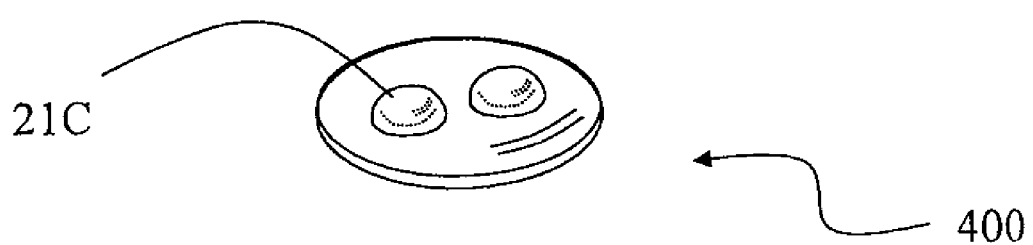
FIG. 15 is a modification embodiment to FIG. 11

FIG. 15 is a modification embodiment to FIG. 11

Two guiding bumps 21C are configured on top surface of a pressure gauge 400. Each of the guiding bumps 21C is located in a position away from periphery to avoid the anti-pressure from the fringe spacer 15. The effect for the pressure gauge 400 is similar to the pressure gauge 300 of FIG. 11.

Figure 16:
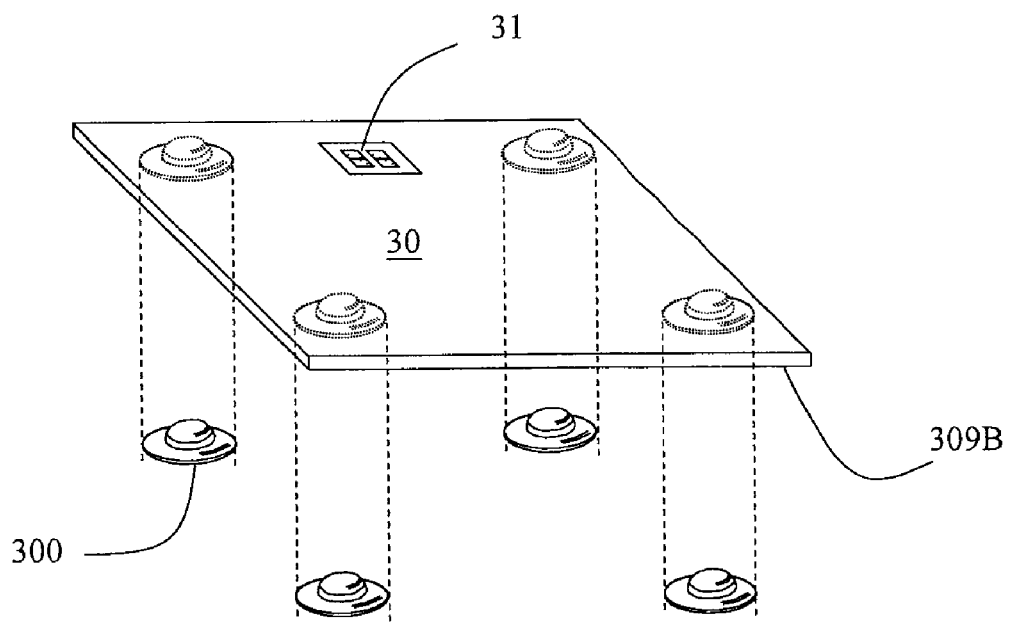
FIG. 16 is a first application embodiment of the present invention

FIG. 16 is a first application embodiment of the present invention

A weighing machine 30 is made of the pressure gauge 300 of FIG. 11. Each of four pressure gauges 300 is configured on bottom of each of the four corners of a hard plate 309B. The four pressure gauges 300 are parallel connected and electrically coupling to a electronic system (not shown). A display 31 is configured to show the weight calculated from the electronic system.

Figure 17:
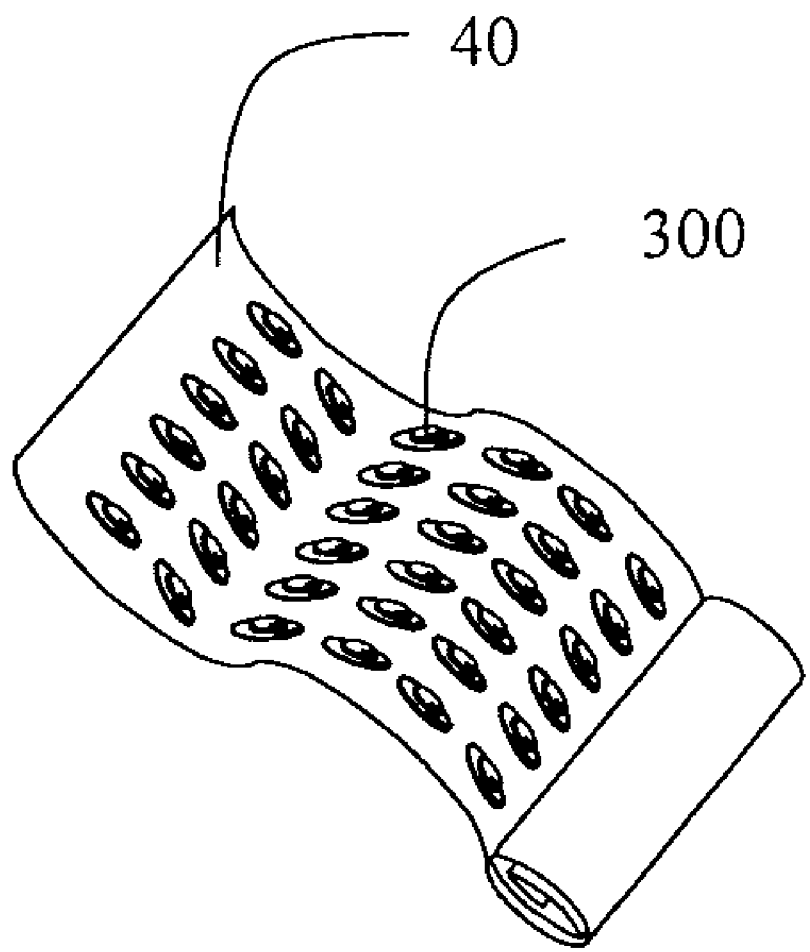
FIG. 17 is a second application embodiment of the present invention

FIG. 17 is a second application embodiment of the present invention

A flexible substrate 40 is used in this application for carrying a plurality of pressure gauges 300. The pressure gauges 300 are arranged in a pattern of a matrix; however different pattern such as a pair of feet for standing, or boxing area for boxing games . . . etc., can be also realized. The flexible substrate weighing machine can be folded or rolled up to put away when unused.

Figure 18:
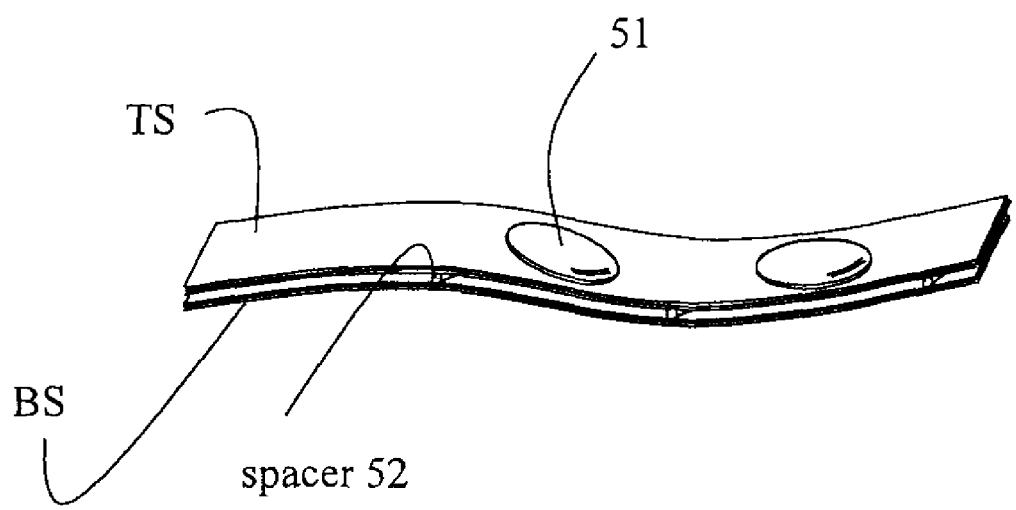
FIG. 18 is a third application embodiment of the present invention

FIG. 18 is a third application embodiment of the present invention

A flexible top stack TS, spacers 52, and a flexible bottom stack BS are sandwiched to form a flexible piezoresistor strip. The top stack TS is composed sequentially of a top substrate, a top metal electrode, and a top piezoresistive layer. The bottom stack BS is composed sequentially of a bottom piezoresistive layer, a bottom metal electrode, and a bottom substrate. A plurality of pressure guiding bumps 51 are configured on top surface of the top substrate. Each of the guiding bumps 51 is configured in a position away from a position above spacers 52.

Figure 19:
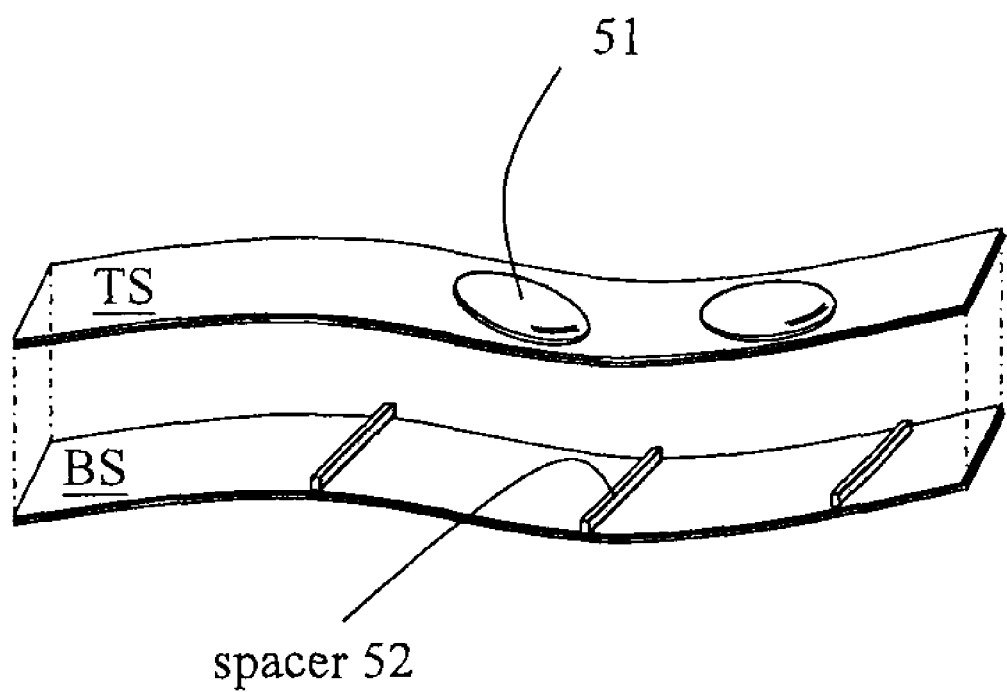
FIG. 19 is an explosion diagram of FIG. 18

FIG. 19 is an explosion diagram of FIG. 18

Spacers 52 are sandwiched in between the top stack TS and the bottom stack BS to create a predetermined space between the two stacks. The spacers 52 are configured in between top piezoresistive layer and bottom piezoresistive layer.

While several embodiments have been described by way of example, it will be apparent to those skilled in the art that various modifications may be made without departing from the spirit of the present invention. Such modifications are all within the scope of the present invention, as defined by the appended claims.

What is claimed is:

1. A pressure gauge, comprising:
   a top stack and a bottom stack;
   a spacer, configured in between said top stack and said bottom stack; and
   a guiding bump, configured on top of said top stack avoiding a position above said spacer so as to cause a fixed deformable area to be deformed when a pressure is applied on said guiding bump.

2. A pressure gauge as claimed in claim 1, wherein said guiding bump has a flat top surface.

3. A pressure gauge as claimed in claim 1, wherein said guiding bump has an arc top surface.

4. A pressure gauge as claimed in claim 1, wherein said guiding bump has a convex top surface.

5. A pressure gauge as claimed in claim 1, wherein
   said top stack sequentially comprising:
      a top substrate;
      a top metal electrode; and
      a top piezoresistive layer;
   said bottom stack sequentially comprising:
      a bottom piezoresistive layer;
      a bottom metal electrode; and
      a bottom substrate.

6. A pressure gauge as claimed in claim 5, wherein said spacer is configured in between said top metal electrode and said bottom metal electrode.

7. A pressure gauge as claimed in claim 5, wherein said spacer is configured in between said top piezoresistive layer and said bottom piezoresistive layer.

8. A pressure gauge, comprising:
   a carrier substrate, and
   a pressure gauge of claim 1, configured on top of said substrate.

9. A pressure gauge as claimed in claim 8, wherein said carrier substrate is rigid.

10. A pressure gauge as claimed in claim 8, wherein said carrier substrate is flexible.

11. A pressure gauge as claimed in claim 9, wherein said rigid substrate is a rectangle having four corners, and
   four pressure gauges, each configured under one of said corners.

12. A pressure gauge as claimed in claim 1, wherein a number of said guiding bump is one.

13. A pressure gauge as claimed in claim 1, wherein a number of said guiding bump is more than one.

14. A pressure gauge as claimed in claim 8, wherein a number of said pressure gauge is one.

15. A pressure gauge as claimed in claim 8, wherein a number of said guiding bump is more than one.

16. A pressure gauge as claimed in claim 15, wherein said more than one pressure gauge is parallel connected.

* * * * *